US012106707B2

(12) United States Patent
Son et al.

(10) Patent No.: US 12,106,707 B2
(45) Date of Patent: Oct. 1, 2024

(54) INVERTER CIRCUIT, SCAN DRIVING CIRCUIT AND DISPLAY DEVICE

(71) Applicant: Samsung Display Co., LTD., Yongin-si (KR)

(72) Inventors: Sungmin Son, Yongin-si (KR); Jae-Jin Song, Yongin-si (KR); Jungwoo Lee, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 18/342,833

(22) Filed: Jun. 28, 2023

(65) Prior Publication Data

US 2024/0127742 A1 Apr. 18, 2024

(30) Foreign Application Priority Data

Oct. 12, 2022 (KR) ........................ 10-2022-0130797

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01)

(58) Field of Classification Search
CPC .. G09G 3/32; G09G 2310/0286; G11C 19/00; G11C 19/28
See application file for complete search history.

(56) References Cited

U.S. PATENT DOCUMENTS 10,453,386 B2 10/2019 Jang
2021/0125547 A1* 4/2021 Lin .......................... G09G 3/32

* cited by examiner

*Primary Examiner* — Sardis F Azongha
(74) *Attorney, Agent, or Firm* — KILE PARK REED & HOUTTEMAN PLLC

(57) ABSTRACT

An inverter circuit in a scan driving circuit of a display device that includes an output transistor connected between a first voltage line and an output terminal outputting a second start signal and including a gate electrode connected to an input terminal receiving a first start signal, a first switching transistor connected between the first voltage line and the output terminal and including a gate electrode connected to a first switching line receiving a first switching signal, a second switching transistor connected between the output terminal and a first node and including a gate electrode connected to a second switching line receiving a second switching signal, and a discharge circuit that discharges the first node to a first bias clock signal in response to the first start signal, the first bias clock signal, and a second bias clock signal.

20 Claims, 8 Drawing Sheets

INVERTER CIRCUIT, SCAN DRIVING CIRCUIT AND DISPLAY DEVICE

CROSS-REFERENCE TO RELATED APPLICATION(S)

This application claims priority to and benefits of Korean Patent Application No. 10-2022-0130797 under 35 U.S.C. § 119, filed on Oct. 12, 2022, in the Korean Intellectual Property Office, the entire contents of which are incorporated herein by reference.

BACKGROUND

Embodiments described herein relate to a display device.

Electronic devices such as a smart phone, a digital camera, a notebook computer, a navigation device, a smart television, and the like that provides images to a user include a display device for displaying images. The display device generates an image and provides the user with the generated image through a display screen.

The display device includes pixels and driving circuits (e.g., a scan driving circuit, a data driving circuit, and a light emission driving circuit) for controlling the pixels. Each of the pixels includes a display element and a pixel circuit for controlling the display element. The driving circuits of the pixel may include organically connected transistors.

To improve image quality, there is a growing need for a display device capable of operating at various driving frequencies.

SUMMARY

Embodiments provide a display device capable of operating at various driving frequencies.

However, embodiments of the disclosure are not limited to those set forth herein. The above and other embodiments will become more apparent to one of ordinary skill in the art to which the disclosure pertains by referencing the detailed description of the disclosure given below.

According to an embodiment, an inverter circuit in a scan driving circuit of a display device may include an output transistor connected between a first voltage line and an output terminal outputting a second start signal and including a gate electrode connected to an input terminal receiving a first start signal, a first switching transistor connected between the first voltage line and the output terminal and including a gate electrode connected to a first switching line receiving a first switching signal, a second switching transistor connected between the output terminal and a first node and including a gate electrode connected to a second switching line receiving a second switching signal, and a discharge circuit that discharges the first node to a first bias clock signal in response to the first start signal, the first bias clock signal, and a second bias clock signal.

According to an embodiment, the second switching signal may be a complementary signal of the first switching signal.

According to an embodiment, during a power-on period and a power-off period, the first switching transistor may be turned on by the first switching signal, and the second switching transistor may be turned off by the second switching signal.

According to an embodiment, during the power-on period and the power-off period, the output terminal may output the second start signal corresponding to a first voltage received through the first voltage line.

According to an embodiment, during the operation period, the first switching transistor may be turned off by the first switching signal, and the second switching transistor may be turned on by the second switching signal.

According to an embodiment, during the operation period, the output terminal may output the second start signal that is a complementary signal of the first start signal.

According to an embodiment, the discharge circuit may include a first transistor connected between a second node and a second clock line and including a gate electrode connected to the input terminal, a second transistor connected between the second node and a second voltage line and including a gate electrode connected to the second clock line, a third transistor connected between the second node and a third node and including a gate electrode connected to the second voltage line, a fourth transistor connected between the first node and a fourth node and including a gate electrode connected to a first clock line, a fifth transistor connected between the fourth node and the first clock line and including a gate electrode connected to the third node, and a capacitor connected between the third node and the fourth node.

According to an embodiment, the first clock line may transfer the first bias clock signal, and the second clock line may transfer the second bias clock signal.

According to an embodiment, a scan driving circuit may include an inverter circuit that outputs a second start signal in response to a first start signal, a first switching signal, a second switching signal, a first bias clock signal, and a second bias clock signal, a first scan driver that outputs first scan signals in response to the first start signal, a first clock signal, and a second clock signal, and a second scan driver that outputs second scan signals in response to the second start signal, the first bias clock signal, and the second bias clock signal. The inverter circuit may include an output transistor connected between a first voltage line and an output terminal outputting the second start signal and including a gate electrode connected to an input terminal receiving the first start signal, a first switching transistor connected between the first voltage line and the output terminal and including a gate electrode connected to a first switching line receiving the first switching signal, a second switching transistor connected between the output terminal and a first node and including a gate electrode connected to a second switching line receiving the second switching signal, and a discharge circuit that discharges the first node to the first bias clock signal in response to the first start signal, the first bias clock signal, and the second bias clock signal.

According to an embodiment, the second switching signal may be a complementary signal of the first switching signal.

According to an embodiment, during a power-on period and a power-off period, the first switching transistor may be turned on by the first switching signal, and the second switching transistor may be turned off by the second switching signal.

According to an embodiment, during the power-on period and the power-off period, the output terminal may output the second start signal corresponding to a first voltage received through the first voltage line.

According to an embodiment, during an operation period, the first switching transistor may be turned off by the first switching signal, and the second switching transistor may be turned on by the second switching signal.

According to an embodiment, during the operation period, the output terminal may output the second start signal that is a complementary signal of the first start signal.

According to an embodiment, the discharge circuit may include a first transistor connected between a second node and a second clock line and including a gate electrode connected to the input terminal, a second transistor connected between the second node and a second voltage line and including a gate electrode connected to the second clock line, a third transistor connected between the second node and a third node and including a gate electrode connected to the second voltage line, a fourth transistor connected between the first node and a fourth node and including a gate electrode connected to a first clock line, a fifth transistor connected between the fourth node and the first clock line and including a gate electrode connected to the third node, and a capacitor connected between the third node and the fourth node, and the first clock line may transfer the first bias clock signal and the second clock line may transfer the second bias clock signal.

According to an embodiment, a display device may include a display panel including a pixel, a scan driving circuit that provides a first scan signal and a second scan signal to the pixel, a data driving circuit that provides a data signal to the pixel, and a driving controller that provides a first start signal, a first switching signal, a second switching signal, a first bias clock signal, and a second bias clock signal to the scan driving circuit. The scan driving circuit may include an inverter circuit that outputs a second start signal in response to the first start signal, the first switching signal, the second switching signal, the first bias clock signal, and the second bias clock signal, a first scan driver that outputs the first scan signal in response to the first start signal, a first clock signal, and a second clock signal, and a second scan driver that outputs the second scan signal in response to the second start signal, the first bias clock signal, and the second bias clock signal, and the inverter circuit outputs the second start signal of a certain voltage level in response to the first switching signal of a first level and the second switching signal of a second level during a power-on period and a power-off period, and the inverter circuit may output the second start signal that is a complementary signal of the first start signal during an operation period.

The inverter circuit may include an output transistor connected between a first voltage line and an output terminal outputting the second start signal and including a gate electrode connected to an input terminal receiving the first start signal, a first switching transistor connected between the first voltage line and the output terminal and including a gate electrode connected to a first switching line receiving the first switching signal, a second switching transistor connected between the output terminal and a first node and including a gate electrode connected to a second switching line receiving the second switching signal, and a discharge circuit that discharges the first node with the second bias clock signal in response to the first start signal, the first bias clock signal, and the second bias clock signal.

According to an embodiment, during the power-on period and the power-off period, the first switching transistor may be turned on by the first switching signal, and the second switching transistor may be turned off by the second switching signal, and during the operation period, the first switching transistor may be turned off by the first switching signal, and the second switching transistor may be turned on by the second switching signal.

According to an embodiment, the discharge circuit may include a first transistor connected between a second node and a second clock line and including a gate electrode connected to the input terminal, a second transistor connected between the second node and a second voltage line and including a gate electrode connected to the second clock line, a third transistor connected between the second node and a third node and including a gate electrode connected to the second voltage line, a fourth transistor connected between the first node and a fourth node and including a gate electrode connected to a first clock line, a fifth transistor connected between the fourth node and the first clock line and including a gate electrode connected to the third node, and a capacitor connected between the third node and the fourth node, and the first clock line may transfer the first bias clock signal and the second clock line may transfer the second bias clock signal.

According to an embodiment, the pixel may include a first transistor receiving the first scan signal, and a second transistor receiving the second scan signal, and the first transistor may be a P-type transistor, and the second transistor may be an N-type transistor.

BRIEF DESCRIPTION OF THE DRAWINGS

The above and other objects and features of the disclosure will become apparent by describing in detail embodiments thereof with reference to the accompanying drawings.

DETAILED DESCRIPTION OF THE EMBODIMENTS

Figure 1:
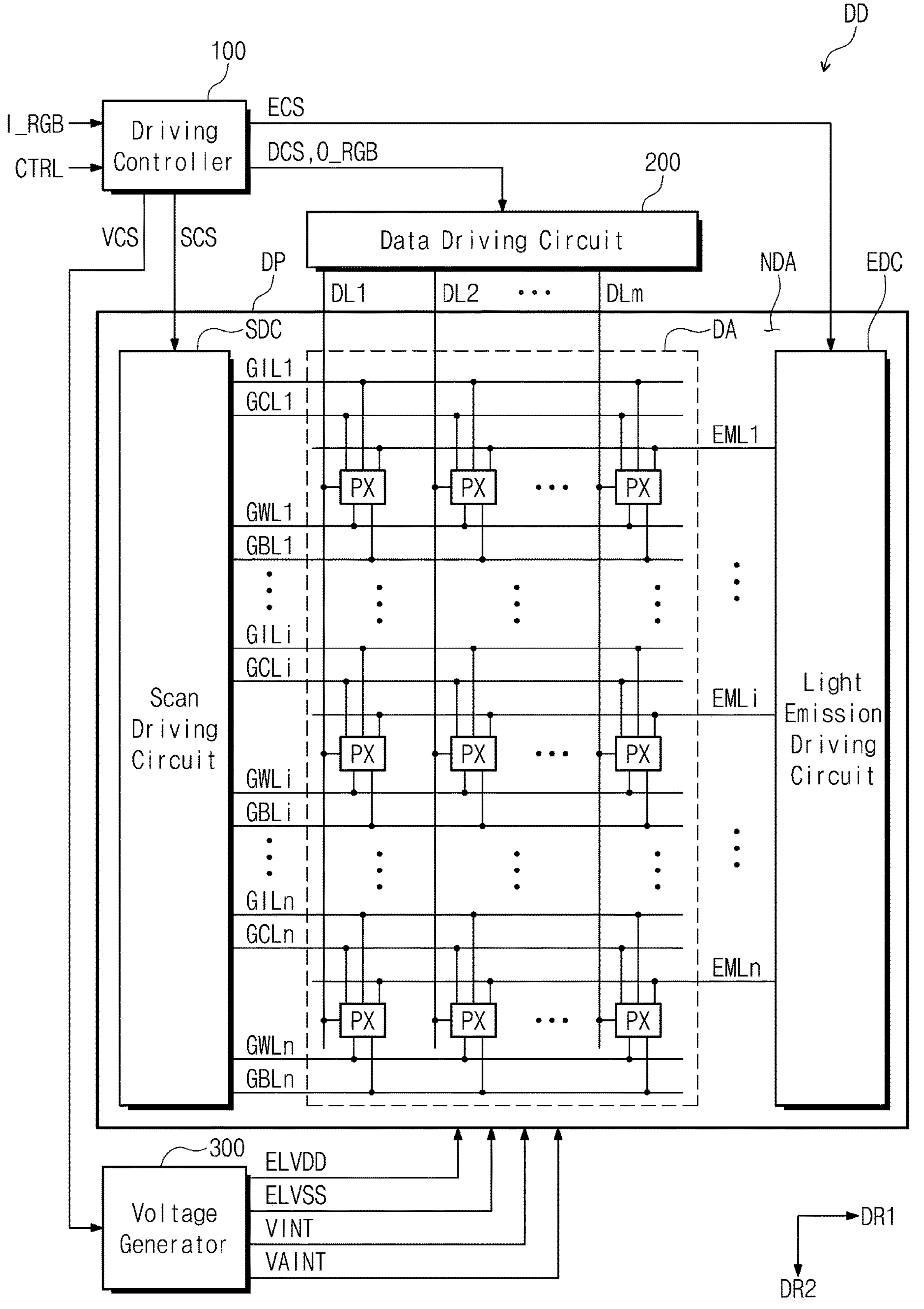
FIG. 1 is a schematic block diagram of a display device according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention.

Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the X, Y, and Z-axes, and may be interpreted in a broader sense. For example, the DR1-axis, the DR2-axis, and the DR3-axis may be perpendicular to one another, or may represent different directions that are not perpendicular to one another. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

Hereinafter, embodiments will be described with reference to accompanying drawings.

FIG. 1 is a schematic block diagram of a display device according to an embodiment.

Referring to FIG. 1, a display device DD may include a display panel DP, a driving controller 100, a data driving circuit 200, and a voltage generator 300.

The driving controller 100 may receive an input image signal I_RGB and a control signal CTRL. The driving controller 100 may generate an output image signal O_RGB obtained by converting a data format of the input image signal I_RGB to be suitable for the display panel DP. The driving controller 100 may output a scan control signal SCS, a data control signal DCS, and a voltage control signal VCS.

The data driving circuit 200 may receive the data control signal DCS and the output image signal O_RGB from the driving controller 100. The data driving circuit 200 may convert the output image signal O_RGB into data signals and may output the data signals to data lines DL1 to DLm to be described below. The data signals refer to analog voltages corresponding to a grayscale level of the output image signal O_RGB.

The voltage generator 300 may generate voltages necessary for an operation of the display panel DP. In an embodiment, the voltage generator 300 may generate a first driving voltage ELVDD, a second driving voltage ELVSS, a first initialization voltage VINT, and a second initialization voltage VAINT.

The display panel DP may include scan lines GIL1 to GILn, GCL1 to GCLn, and GWL1 to GWLn, GBL1 to GBLn, emission control lines EML1 to EMLn, data lines DL1 to DLm, and pixels PX. The display panel DP may further include a scan driving circuit SDC and a light emission driving circuit EDC.

In an embodiment, the pixels PX may be arranged in a display area DA, and the scan driving circuit SDC and the light emission driving circuit EDC may be arranged in a non-display area NDA.

In an embodiment, the scan driving circuit SDC may be arranged at a first side of the non-display area NDA in the display panel DP. The scan lines GIL1 to GILn, GCL1 to GCLn, GWL1 to GWLn, and GBL1 to GBLn may extend from the scan driving circuit SDC in the first direction DR1.

The light emission driving circuit EDC may be arranged on a second side of the non-display area NDA in the display panel DP. The emission control lines EML1 to EMLn may extend from the light emission driving circuit EDC in a direction opposite to the first direction DR1.

The scan lines GIL1 to GILn, GCL1 to GCLn, GWL1 to GWLn, and GBL1 to GBLn and the emission control lines EML1 to EMLn may be arranged to be spaced apart from one another in the second direction DR2. The data lines DL1 to DLm may extend from the data driving circuit 200 in the second direction DR2, and may be arranged to be spaced apart from one another in the first direction DR1.

In an example illustrated in FIG. 1, the scan driving circuit SDC and the light emission driving circuit EDC may be arranged facing each other with the pixels PX interposed therebetween, but embodiments are not limited thereto. For example, the scan driving circuit SDC and the light emission driving circuit EDC may be disposed adjacent to each other on one of the first side and the second side of the display panel DP. In an embodiment, the scan driving circuit SDC and the light emission driving circuit EDC may be implemented as an integrated circuit (or a single chip).

Each of the pixels PX may be connected (e.g., electrically connected) to four scan lines and one emission control line. For example, as illustrated in FIG. 1, the pixels PX in a first row may be connected (e.g., electrically connected) to the scan lines GILL GCL1, GWL1, and GBL1 and the emission control line EML1. For example, the pixels PX in an i-th row may be connected (e.g., electrically connected) to the scan lines GILi, GCLi, GWLi and GBLi and the emission control line EMLi.

Each of the pixels PX may include a light emitting device ED (refer to FIG. 2) and a pixel circuit PXC (refer to FIG. 2) for controlling light emission of the light emitting device ED. The pixel circuit PXC may include one or more transistors and one or more capacitors. The scan driving circuit SDC and the light emission driving circuit EDC may include transistors formed through the same process as the pixel circuit PXC.

Each of the pixels PX may receive the first driving voltage ELVDD, the second driving voltage ELVSS, the first initialization voltage VINT, and the second initialization voltage VAINT from the voltage generator 300.

The scan driving circuit SDC may receive the scan control signal SCS from the driving controller 100. The scan driving circuit SDC may output scan signals to the scan lines GILL to GILn, GCL1 to GCLn, GWL1 to GWLn, and GBL1 to GBLn in response to the scan control signal SCS.

The light emission driving circuit EDC may receive an emission control signal ECS from the driving controller 100. The light emission driving circuit EDC may output emission signals to the emission control lines EML1 to EMLn in response to the emission control signal ECS.

Figure 2:
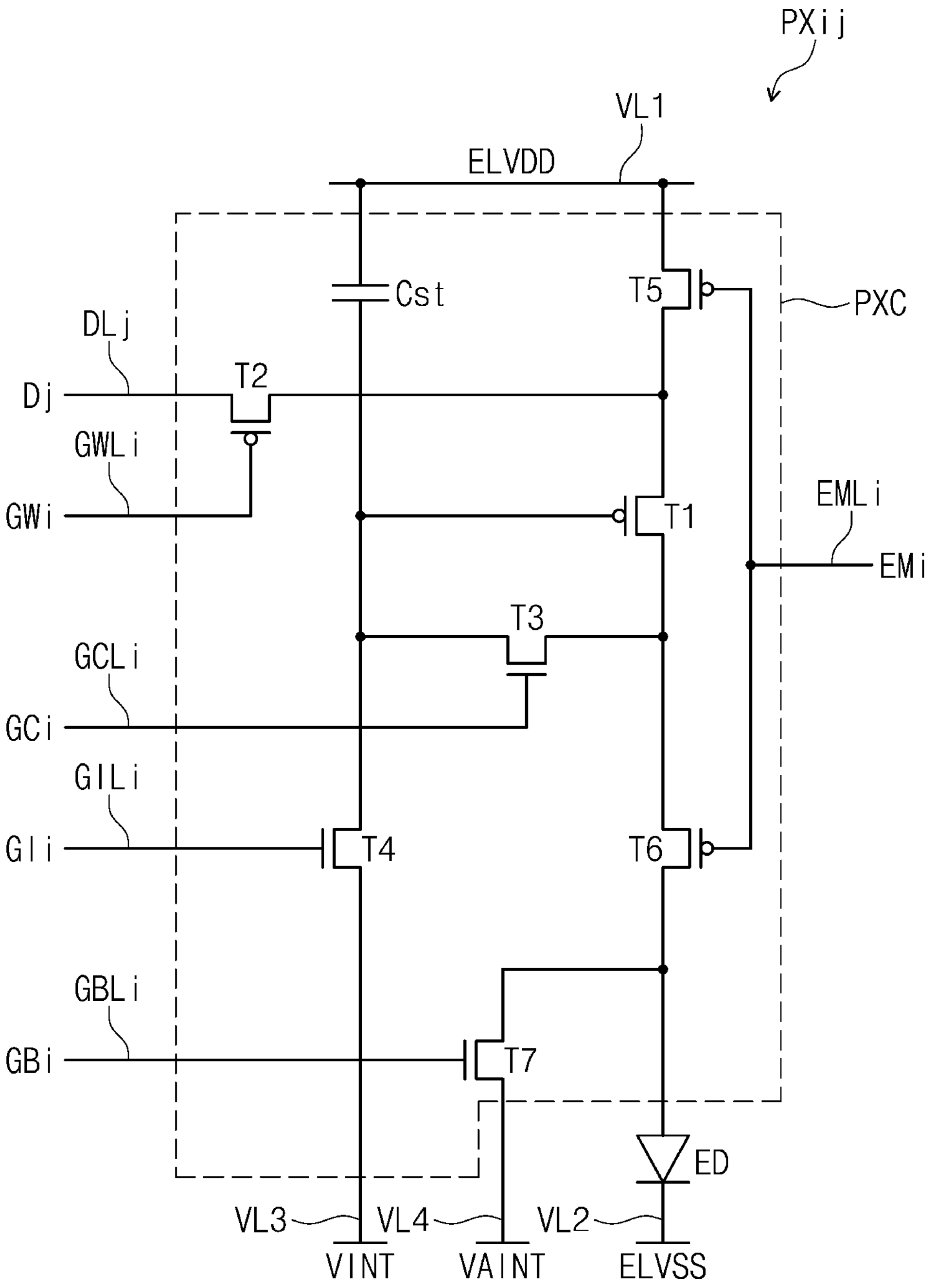
FIG. 2 is a schematic diagram of an equivalent circuit of a pixel according to an embodiment.

FIG. 2 is a schematic diagram of an equivalent circuit of a pixel according to an embodiment.

FIG. 2 illustrates a schematic diagram of an equivalent circuit of a pixel PXij connected to the j-th data line DLj, the i-th scan lines GILi, GCLi, GWLi, and GBLi, and the i-th emission control line EMLi illustrated in FIG. 1, as an example.

Each of the pixels PX illustrated in FIG. 1 may have the same circuit configuration as the equivalent circuit of the pixel PXij illustrated in FIG. 2. In an embodiment, the pixel PXij may include the pixel circuit PXC and the at least one light emitting device ED. In an embodiment, the light emitting device ED may be a light emitting diode. The pixel circuit PXC may include first to seventh transistors T1, T2, T3, T4, T5, T6, and T7 and a capacitor Cst.

Among the first to seventh transistors T1 to T7, the third, fourth, and seventh transistors T3, T4, and T7 may be N-type transistors having an oxide semiconductor as a semiconductor layer, and each of the first, second, fifth, and sixth transistors T1, T2, T5, and T6 may be a P-type transistor having a low-temperature polycrystalline silicon (LTPS) semiconductor layer. However, embodiments are not limited thereto. For example, all of the first to seventh transistors T1 to T7 may be the P-type transistors or the N-type transistors. In an embodiment, at least one of the first to seventh transistors T1 to T7 may be the N-type transistor, and the remaining transistors may be the P-type transistors.

The scan lines GILi, GCLi, GWLi, and GBLi may transfer scan signals GIi, GCi, GWi, and GBi, respectively, and the emission control line EMLi may transfer an emission signal EMi. The data line DLj may transfer a data signal Dj. The data signal Dj may have a voltage level corresponding to an input image signal RGB input to the display device DD (refer to FIG. 1). First to fourth driving voltage lines VL1, VL2, VL3, and VL4 may transfer the first driving voltage ELVDD, the second driving voltage ELVSS, the first initialization voltage VINT, and the second initialization voltage VAINT, respectively.

The first transistor T1 may include a first electrode connected to the first driving voltage line VL1 through the fifth transistor T5, a second electrode connected (e.g., electrically connected) to an anode of the light emitting device ED through the sixth transistor T6, and a gate electrode connected to an end portion of the capacitor Cst. The first transistor T1 may receive the data signal Dj transferred by the data line DLj according to a switching operation of the second transistor T2 and may supply a driving current to the light emitting device ED.

The second transistor T2 may include a first electrode connected to the data line DLj, a second electrode connected to the first electrode of the first transistor T1, and a gate electrode connected to the scan line GWLi. The second transistor T2 may be turned on according to the scan signal GWi received through the scan line GWLi and may transfer the data signal Dj transferred from the data line DLj to a first electrode of the first transistor T1.

The third transistor T3 may include a first electrode connected to the gate electrode of the first transistor T1, a second electrode connected to the second electrode of the first transistor T1, and a gate electrode connected to the scan line GCLi. The third transistor T3 may be turned on according to the scan signal GCi received through the scan line GCLi, and thus, the gate electrode and the second electrode of the first transistor T1 may be connected (e.g., electrically connected), e.g., the first transistor T1 may be diode-connected.

The fourth transistor T4 may include a first electrode connected to the gate electrode of the first transistor T1, a second electrode connected to the third driving voltage line VL3 through which the first initialization voltage VINT is supplied, and a gate electrode connected to the scan line GILi. The fourth transistor T4 may be turned on according to the scan signal GIi received through the scan line GILi and may perform an initialization operation of initializing a voltage of the gate electrode of the first transistor T1 by transferring the first initialization voltage VINT to the gate electrode of the first transistor T1.

The fifth transistor T5 may include a first electrode connected to the first driving voltage line VL1, a second electrode connected to the first electrode of the first transistor T1, and a gate electrode connected to the emission control line EMLi.

The sixth transistor T6 may include a first electrode connected to the second electrode of the first transistor T1, a second electrode connected to the anode of the light emitting device ED, and a gate electrode connected to the emission control line EMLi.

The fifth transistor T5 and the sixth transistor T6 may be simultaneously turned on according to the emission signal EMi transferred through the emission control line EMLi. As such, the first driving voltage ELVDD may be compensated for through the diode-connected first transistor T1 so as to be transferred to the light emitting device ED.

The seventh transistor T7 may include a first electrode connected to the anode of the light emitting device ED, a second electrode connected to the fourth driving voltage line VL4, and a gate electrode connected to the scan line GBLi. The seventh transistor T7 may be turned on according to the scan signal GBi received through the scan line GBLi, and may bypass a current of the anode of the light emitting device ED to the fourth driving voltage line VL4.

As described above, an end portion of the capacitor Cst may be connected (e.g., electrically connected) to the gate electrode of the first transistor T1, and another end portion of the capacitor Cst may be connected (e.g., electrically connected) to the first driving voltage line VL1. The anode of the light emitting device ED may be connected to (e.g., electrically connected) the second electrode of the sixth transistor T6, and the cathode of the light emitting device ED may be connected to the second driving voltage line VL2 that transfers the second driving voltage ELVSS.

A circuit configuration of the pixel PXij according to an embodiment is not limited to FIG. 2. The number of transistors and capacitors included in the pixel circuit PXC in the pixel PXij and the connection relationship may be variously modified.

Figure 3:
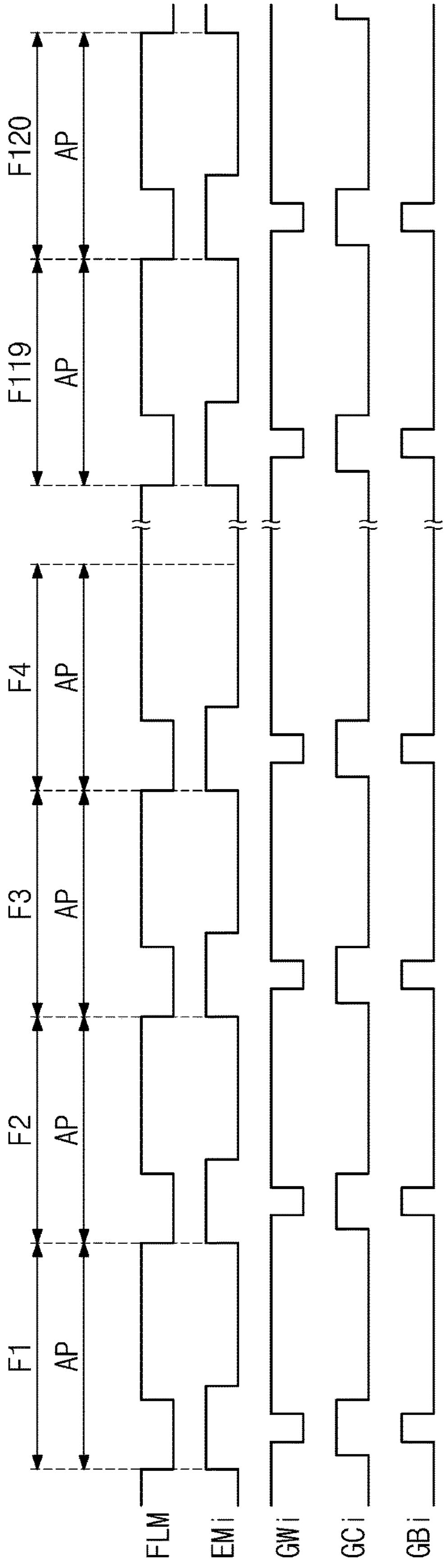
FIG. 3 is a timing diagram for describing an operation of a pixel illustrated in FIG. 2 in case that a driving frequency is a first frequency.

FIG. 3 is a timing diagram for describing an operation of the pixel PXij illustrated in FIG. 2 in case that a driving frequency is a first frequency. Hereinafter, an operation of a display device according to an embodiment will be described with reference to FIGS. 2 and 3.

Referring to FIGS. 2 and 3, in case that the driving frequency is a first frequency, e.g., 120 Hz, the pixels PXij may sequentially operate from a first frame F1 to a 120th frame F120.

The scan driving circuit SDC illustrated in FIG. 1 may output the scan signals GIi, GWi, GCi, and GBi in response to a first start signal FLM included in the scan control signal SCS provided from the driving controller 100.

Although the scan signal GIi is not illustrated in FIG. 3, the scan signal GIi of a high level may be provided through the scan line GILi during the non-emission period in which the emission signal EMi is at a high level in the first frame F1. In case that the fourth transistor T4 is turned on in response to the scan signal GIj having a high level, the first initialization voltage VINT may be transferred to the gate electrode of the first transistor T1 through the fourth transistor T4 so as to initialize the first transistor T1.

In case that the scan signal GCi having of a high level is supplied through the scan line GCLi, the third transistor T3 may be turned on. The first transistor T1 may be diode-connected by the turned-on third transistor T3 and may be biased in a forward direction. For example, the second transistor T2 may be turned on by the scan signal GWi of the low level. Accordingly, a compensation voltage, which is obtained by reducing the voltage of the data signal Dj supplied from the data line DLj by a threshold voltage (referred to as Vth) of the first transistor T1, may be applied to the gate electrode of the first transistor T1. For example, a gate voltage applied to the gate electrode of the first transistor T1 may be the compensation voltage.

The first driving voltage ELVDD and the compensation voltage may be applied to end portions (e.g., opposite end portions) of the capacitor Cst, and charges corresponding to a voltage difference between the both ends may be stored in the capacitor Cst.

For example, the seventh transistor T7 may be turned on by receiving the scan signal GBi having a low level through the scan line GBLi. The anode of the light emitting device ED may be initialized to the second initialization voltage VAINT of the fourth driving voltage line VL4 by the seventh transistor T7.

Subsequently, the fifth transistor T5 and the sixth transistor T6 may be turned on during the emission period in which the emission signal EMi is at a low level. Accordingly, a driving current may be generated according to a voltage difference between the gate voltage of the gate electrode of the first transistor T1 and the first driving voltage ELVDD and the driving current may be supplied to the light emitting device ED through the sixth transistor T6, so the light emitting device ED may emit light.

The pixel PXij may operate in the same manner as the first frame F1 in each of the second frame F2 to the 120th frame F120 illustrated in FIG. 3. In each of the first frame F1 to the 120th frame F120, the pixel PXij may receive the data signal Dj. Therefore, each of the first frame F1 to the 120th frame F120 may be referred to as an address period AP or an active period.

The first start signal FLM included in the scan control signal SCS provided from the driving controller 100 may be a signal indicating a start of the address period AP of each of the first frame F1 to the 120th frame F120.

Figure 4:
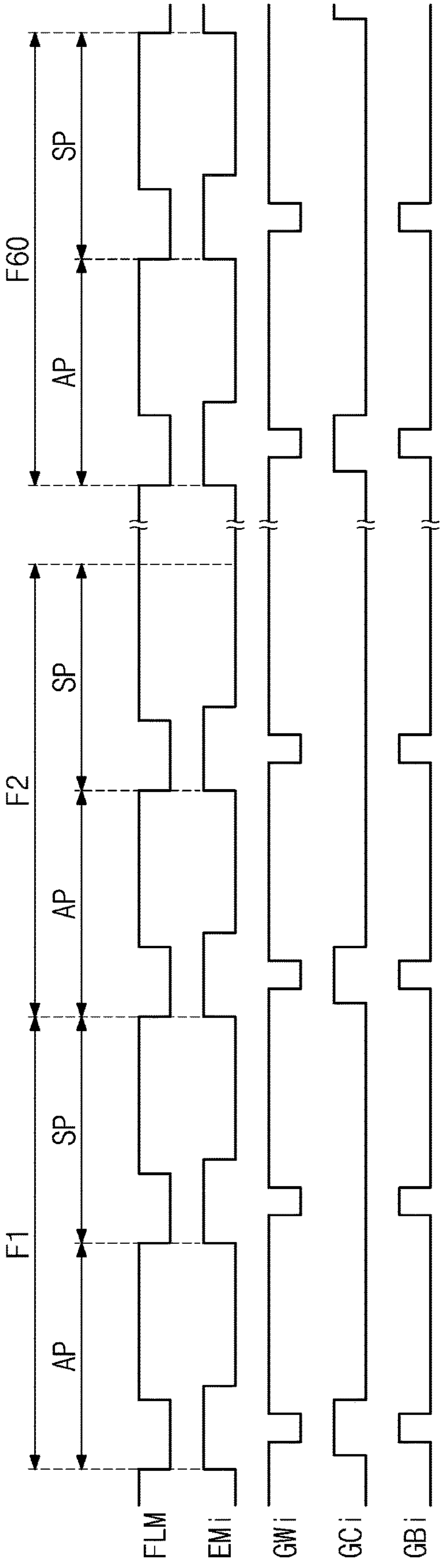
FIG. 4 is a timing diagram for describing an operation of a pixel illustrated in FIG. 2 in case that a driving frequency is a second frequency.

FIG. 4 is a timing diagram for describing an operation of the pixel PXij illustrated in FIG. 2 in case that a driving frequency is a second frequency. Hereinafter, an operation of a display device according to an embodiment will be described with reference to FIGS. 2 and 4.

Referring to FIGS. 2 and 4, in case that the driving frequency is a second frequency, e.g., 60 Hz, the pixels PXij may sequentially operate from the first frame F1 to a 60th frame F60. Each of the first frame F1 to the 60th frame F60 may include the address period AP (or the active period) and a self-scan period SP. In case that the driving frequency is 60 Hz, the pixel PXij in the address period AP of each of the first frame F1 to the 60th frame F60 may operate in the same way as the address period AP of each of the first frame F1 to the 120th frame F120 in case that the driving frequency illustrated in FIG. 3 is 120 Hz.

In the self-scan period SP of each of the first frame F1 to the 60th frame F60, the scan signals GIi and GCi may be maintained at a low level. In case that the scan signal GWi may transition to a low level in the self-scan period SP, the data signal Dj provided through the data line DLj may be provided to the first electrode of the first transistor T1. In the self-scan period SP, the data signal Dj provided through the data line DLj may be an initialization signal for initializing the first electrode of the first transistor T1.

For example, in case that the scan signal GBi may transition to a high level in the self-scan period SP, the seventh transistor T7 may be turned on. As the seventh transistor T7 may be turned on, the anode of the light emitting device ED may be initialized to the second initialization voltage VAINT.

In the self-scan period SP, the scan signal GWi may transition to a low level and the scan signal GBi may transition to a high level.

The first start signal FLM included in the scan control signal SCS provided from the driving controller 100 may be a signal indicating a start of the address period AP and the self-scan period SP of each of the first frame F1 to the 60th frame F60.

Figure 5:
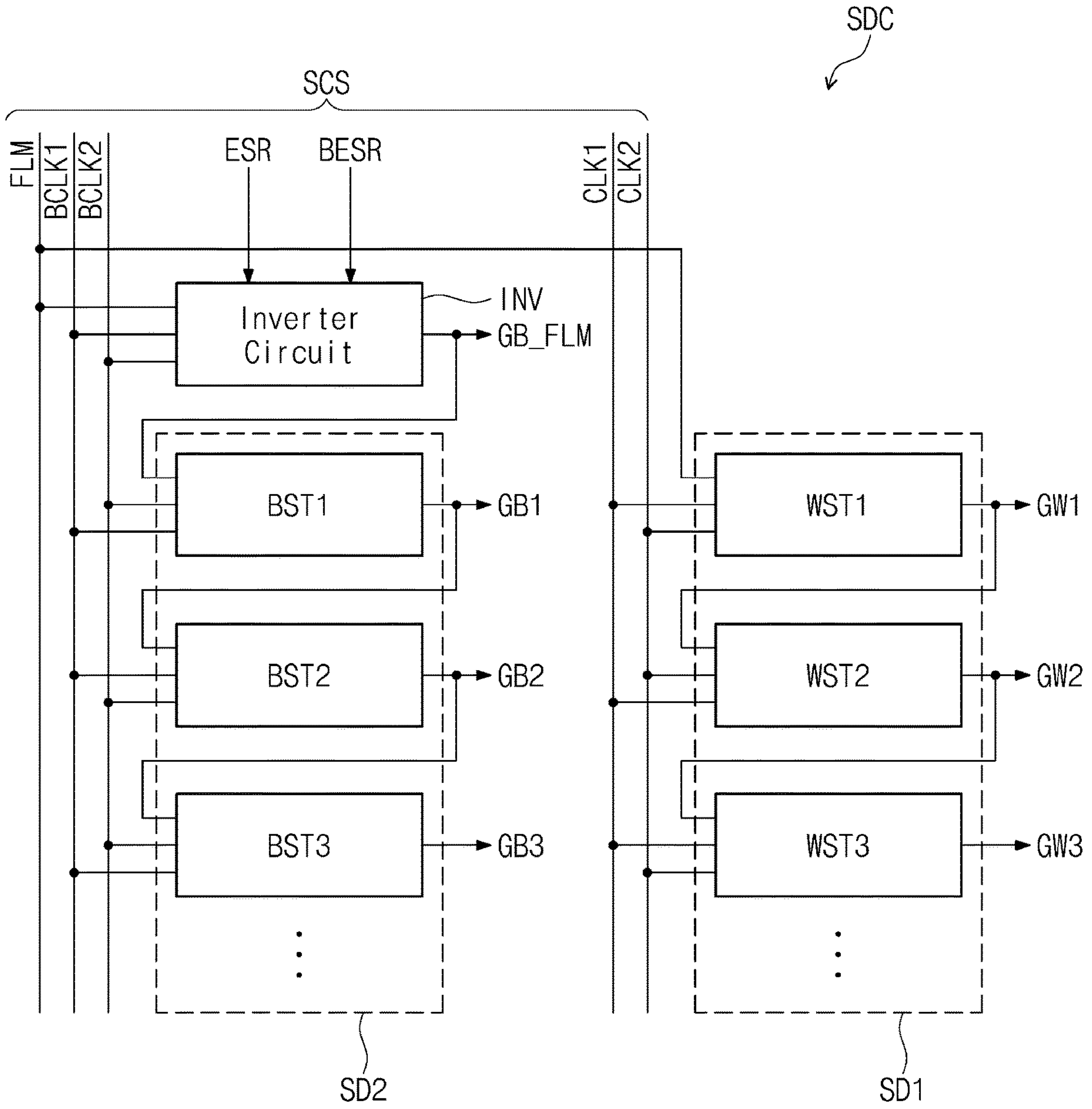
FIG. 5 is a schematic block diagram illustrating a configuration of a scan driving circuit according to an embodiment.

FIG. 5 is a schematic block diagram illustrating a configuration of the scan driving circuit SDC according to an embodiment.

Referring to FIG. 5, the scan driving circuit SDC may include an inverter circuit INV, a first scan driver SD1, and a second scan driver SD2.

The scan control signal SCS provided from the driving controller 100 illustrated in FIG. 1 to the scan driving circuit SDC may include the first start signal FLM, a first clock signal CLK1, a second clock signal CLK2, a first bias clock signal BCLK1, a second bias clock signal BCLK2, a first switching signal ESR, and a second switching signal BESR.

The inverter circuit INV may receive the first start signal FLM, the first bias clock signal BCLK1, the second bias clock signal BCLK2, the first switching signal ESR, and the second switching signal BESR, and may output a second start signal GB_FLM.

The first scan driver SD1 may receive the first start signal FLM, the first clock signal CLK1, and the second clock signal CLK2, and may output scan signals GW1, GW2, and GW3. The scan signals GW1, GW2, and GW3 may be provided to the scan lines GWL1 to GWLn illustrated in FIG. 1.

The first scan driver SD1 may include write stages WST1, WST2, and WST3. The number of write stages WST1, WST2, and WST3 included in the first scan driver SD1 may be the same as the number of scan lines GWL1 to GWLn disposed on the display panel DP.

The write stage WST1 may receive the first start signal FLM, the first clock signal CLK1, and the second clock signal CLK2, and may output the scan signal GW1.

The write stage WST2 may receive the scan signal GW1, the first clock signal CLK1, and the second clock signal CLK2 from the previous write stage, e.g., the write stage WST1, and may output the scan signal GW2.

The write stage WST3 may receive the scan signal GW1, the first clock signal CLK1, and the second clock signal CLK2 from the previous write stage, e.g., the write stage WST2, and may output the scan signal GW3.

The second scan driver SD2 may receive the second start signal GB_FLM, the first bias clock signal BCLK1, and the second bias clock signal BCLK2, and may output scan signals GB1, GB2, and GB3. The scan signals GB1, GB2, and GB3 may be provided to the scan lines GBL1 to GBLn illustrated in FIG. 1.

The second scan driver SD2 may include bias stages BST1, BST2, and BST3. The number of bias stages BST1, BST2, and BST3 included in the second scan driver SD2 may be the same as the number of scan lines GBL1 to GBLn disposed on the display panel DP.

The bias stage BST1 may receive the second start signal GB_FLM, the first bias clock signal BCLK1, and the second bias clock signal BCLK2, and may output the scan signal GB1.

The bias stage BST2 may receive the scan signal GB1, the first bias clock signal BCLK1, and the second bias clock signal BCLK2 from the previous bias stage, e.g., the bias stage BST1, and may output the scan signal GB2.

The bias stage BST3 may receive the scan signal GB2, the first bias clock signal BCLK1, and the second bias clock signal BCLK2 from the previous bias stage, e.g., the bias stage BST2, and may output the scan signal GB3.

Figure 6:
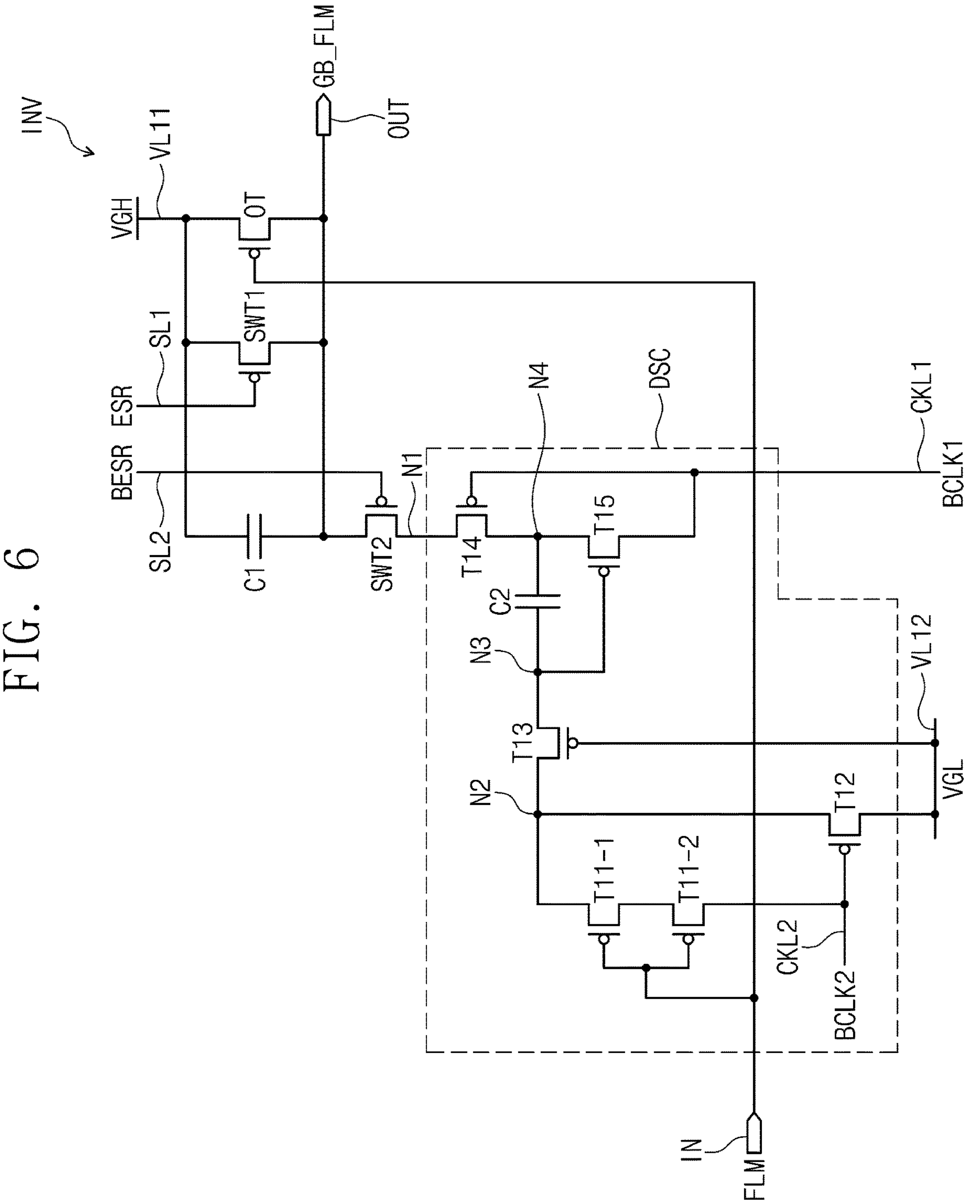
FIG. 6 is a schematic diagram of an equivalent circuit of an inverter circuit according to an embodiment.

FIG. 6 is a schematic circuit of an equivalent circuit of the inverter circuit INV according to an embodiment.

Figure 7:
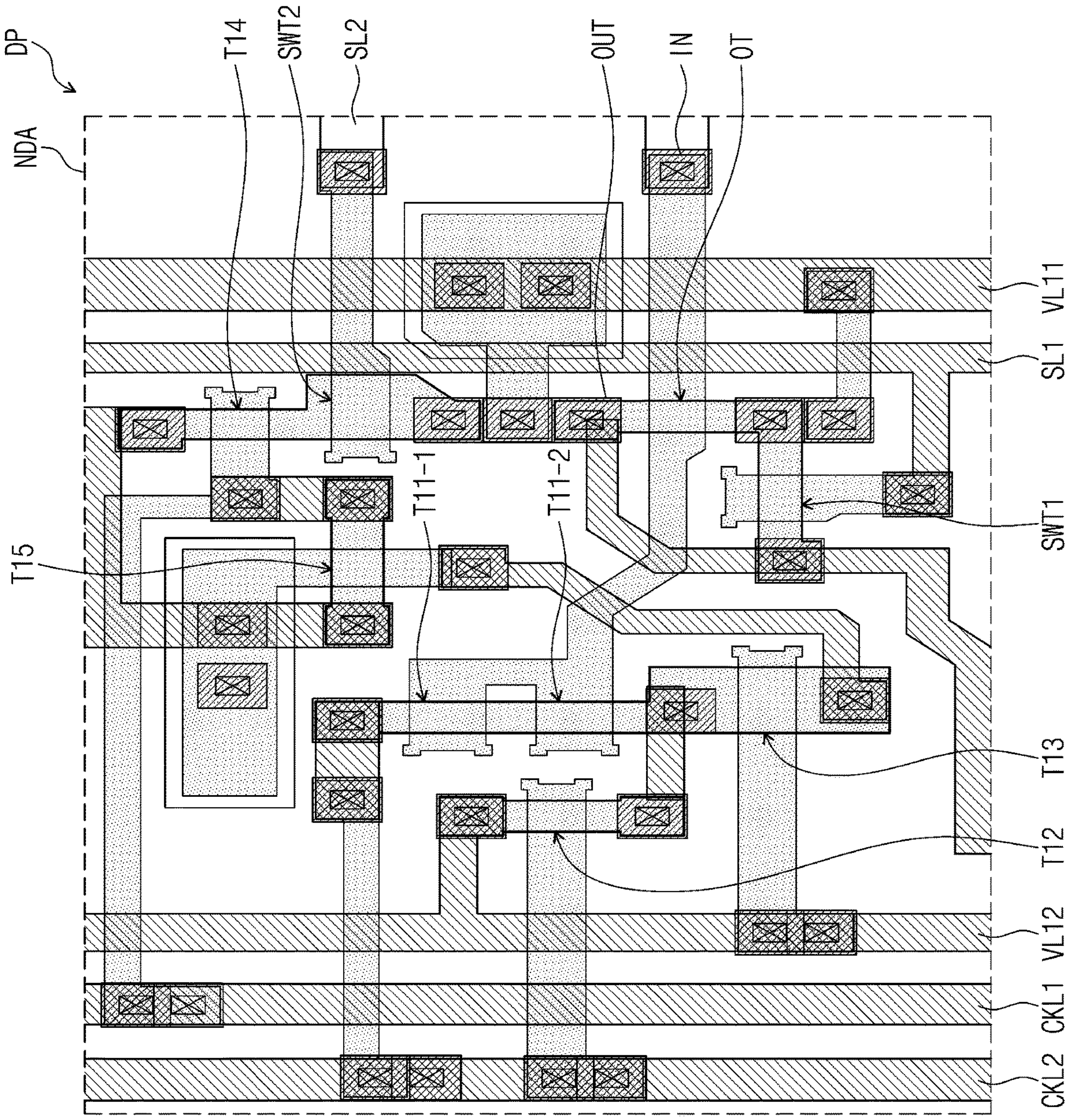
FIG. 7 is a schematic plan view of an inverter circuit in a scan driving circuit in a non-display area according to an embodiment.

FIG. 7 is a plan view of the inverter circuit INV in the scan driving circuit SDC in the non-display area NDA according to an embodiment.

Referring to FIGS. 6 and 7, the inverter circuit INV may include a discharge circuit DSC, a capacitor C1, a first switching transistor SWT1, a second switching transistor SWT2, and an output transistor OT.

The capacitor C1 may be connected (e.g., electrically connected) between the first voltage line VL11 through which a first voltage VGH is received and an output terminal OUT. The first voltage VGH may be provided from the voltage generator 300 illustrated in FIG. 1.

The output transistor OT may output the first voltage VGH as the second start signal GB_FLM in response to the first start signal FLM. The output transistor OT may be connected (e.g., electrically connected) between the first voltage line VL11 through which the first voltage VGH is received and the output terminal OUT, and may include a gate electrode connected to an input terminal IN receiving the first start signal FLM.

The first switching transistor SWT1 may output the first voltage VGH as the second start signal GB_FLM in response to the first switching signal ESR.

The first switching transistor SWT1 may be connected (e.g., electrically connected) between the first voltage line VL11 through which the first voltage VGH is received and the output terminal OUT, and may include a gate electrode connected to the first switching line SL1 receiving the first switching signal ESR.

The second switching transistor SWT2 may connect (e.g., electrically connect) the output terminal OUT to a first node N1 in response to the second switching signal BESR.

The second switching transistor SWT2 may be connected (e.g., electrically connected) between the output terminal OUT and the first node N1 and may include a gate electrode connected to the second switching line SL2 receiving the second switching signal BESR.

The discharge circuit DSC may discharge the first node N1 to the first bias clock signal BCLK1 in response to the first start signal FLM, the first bias clock signal BCLK1, and the second bias clock signal BCLK2.

The discharge circuit DSC may include transistors T11-1, T11-2, T12, T13, T14, and T15 and a capacitor C2.

The transistors T11-1 and T11-2 may be connected (e.g., electrically connected) between a second node N2 and a second clock line CKL2 and include gate electrodes connected to the input terminal IN. The second clock line CKL2 may transfer the second bias clock signal BCLK2.

The transistor T12 may be connected (e.g., electrically connected) between the second node N2 and a second voltage line VL12 and may include a gate electrode connected to the second clock line CKL2. The second voltage line VL12 may receive a second voltage VGL. The second voltage VGL may be provided from the voltage generator 300 illustrated in FIG. 1.

The transistor T13 may be connected (e.g., electrically connected) between the second node N2 and a third node N3 and may include a gate electrode connected to the second voltage line VL12.

The capacitor C2 may be connected (e.g., electrically connected) between the third node N3 and a fourth node N4.

The transistor T14 may be connected (e.g., electrically connected) between the first node N1 and the fourth node N4 and may include a gate electrode connected to the first clock line CKL1. The first clock line CKL1 may transfer the first bias clock signal BCLK1.

The transistor T15 may be connected (e.g., electrically connected) between the fourth node N4 and the first clock line CKL1 and may include a gate electrode connected to the third node N3.

In an embodiment, the transistors T11-1, T11-2, and T12-T15, the output transistor OT, the first switching transistor SWT1, and the second switching transistor SWT2, which are included in the inverter circuit INV may be all P-type transistors. However, embodiments are not limited thereto. In an embodiment, at least one of the transistors T11-1, T11-2, and T12-T15, the output transistor OT, the first switching transistor SWT1, and the second switching transistor SWT2 may be an N-type transistor.

Figure 8:
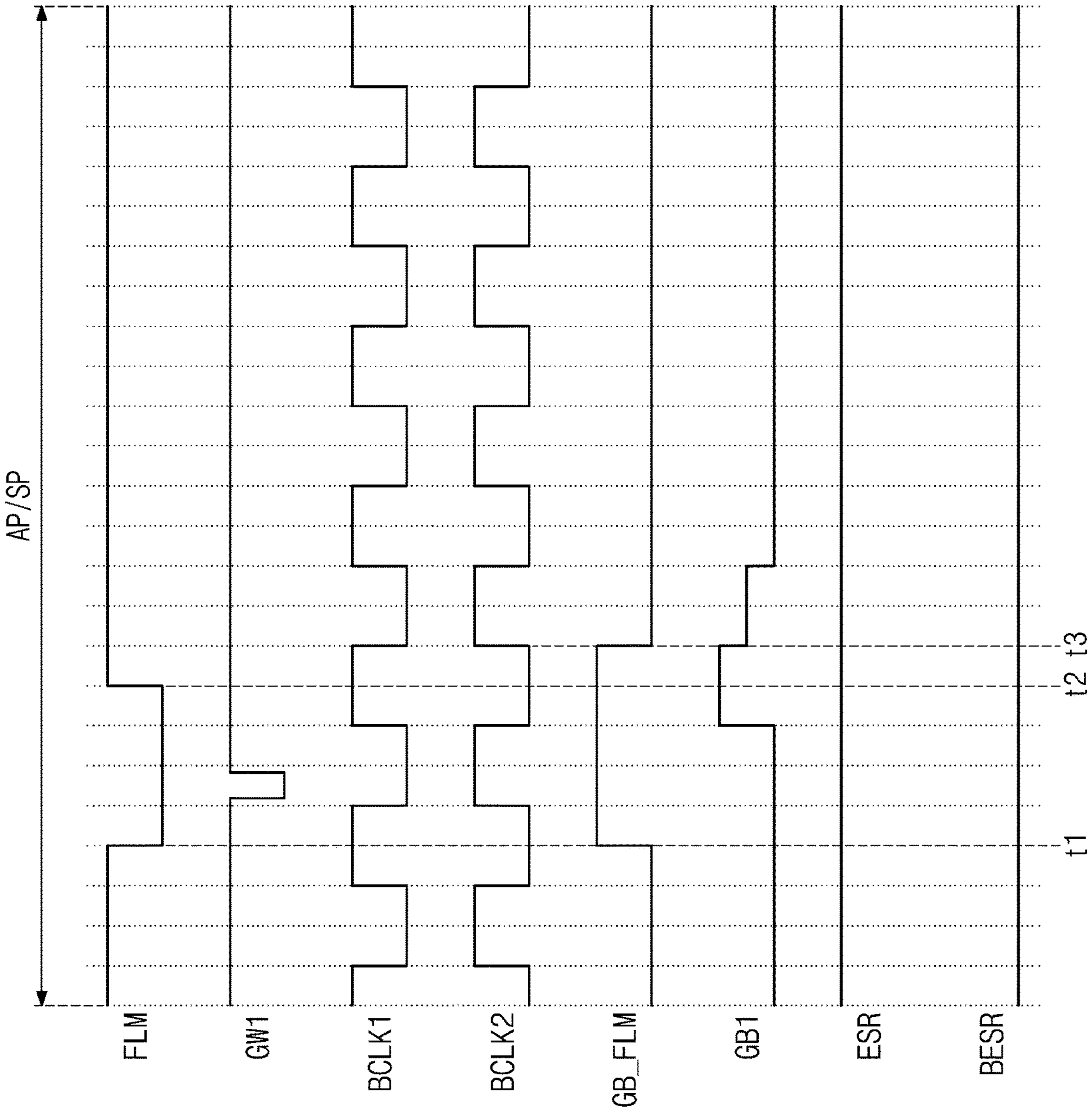
FIG. 8 is a timing diagram for illustratively describing an operation of an inverter circuit in an address period or a self-scan period SP.

FIG. 8 is a timing diagram for illustratively describing an operation of the inverter circuit INV in the address period AP or the self-scan period SP.

Referring to FIGS. 6 and 8, in the address period AP or the self-scan period SP, the first switching signal ESR may be maintained at a high level and the second switching signal BESR may be maintained at a low level. Therefore, in the address period AP or the self-scan period SP, the first switching transistor SWT1 may maintain a turned-off state and the second switching transistor SWT2 may maintain a turned-on state.

In case that the first start signal FLM may transition to a low level at a first point t1, the output transistor OT may be turned on. As the output transistor OT is turned on, the first voltage VGH may be output as the second start signal GB_FLM.

For example, the write stage WST1 in the first scan driver SD1 illustrated in FIG. 5 may output the scan signal GW1 of a low level in response to the first start signal FLM of a low level.

The bias stage BST1 in the second scan driver SD2 illustrated in FIG. 5 may output the scan signal GB1 of a high level in response to the second start signal GB_FLM of a high level.

Although the first start signal FLM transitions to a high level at a second point t2, since the first bias clock signal BCLK1 is at a high level, the second start signal GB_FLM may be maintained at a high level.

At the second point t2, since the second bias clock signal BCLK2 is at a low level, the transistor T12 may be turned on. In case that the transistor T12 is turned on, the second node N2 may receive the second voltage VGL, and the third node N3 also may receive the second voltage VGL through the turned-on transistor T13. The second voltage VGL may be a voltage level capable of turning on the transistor T15.

In case that the second bias clock signal BCLK2 may transition to a high level at a third point t3, the transistor T12 may be turned off. Thus, the third node N3 may be maintained at a low level by the capacitor C2.

At the third point t3, in case that the first bias clock signal BCLK1 may transition to a low level, the transistor T14 may be turned on. The second start signal GB_FLM of the output terminal OUT may be discharged to the first bias clock signal BCLK1 of a low level through the second switching transistor SWT2 and the transistors T14 and T15, which are turned on.

Referring back to FIGS. 2 and 5, the scan control signal SCS provided from the driving controller 100 to the scan driving circuit SDC may include a single start signal, e.g., the first start signal FLM.

The first start signal FLM may be a signal that is activated to a low level at the start of each of the address period AP and the self-scan period SP (refer to FIGS. 3 and 4) within one frame.

The inverter circuit INV may receive the first start signal FLM and may output the second start signal GB_FLM. The second start signal GB_FLM may be a signal that is activated to a high level at the start of each of the address period AP and the self-scan period SP (refer to FIGS. 3 and 4) within one frame. For example, the inverter circuit INV may output the second start signal GB_FLM obtained by inverting the first start signal FLM.

Figure 9:
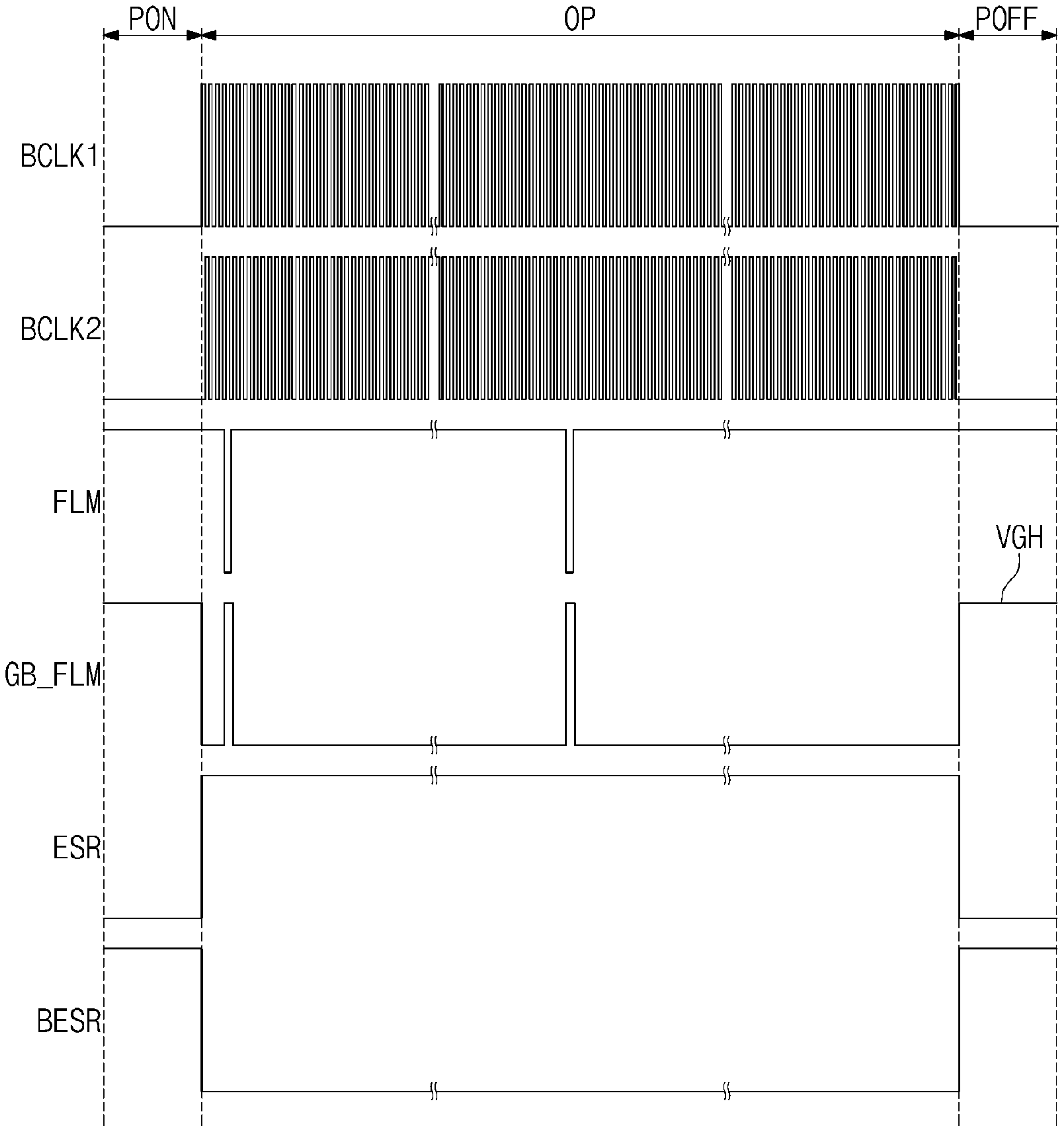
FIG. 9 is a timing diagram for illustratively describing an operation of an inverter circuit in a power-on period, an operation period, and a power-off period according to an embodiment.

FIG. 9 is a timing diagram for illustratively describing an operation of the inverter circuit INV in a power-on period PON, an operation period OP, and a power-off period POFF according to an embodiment.

Referring to FIGS. 6 and 9, in the power-on period PON, the first switching signal ESR may be at a low level and the second switching signal BESR may be at a high level. In case that the first switching signal ESR is at a low level, the first switching transistor SWT1 may be turned on such that the first voltage line VL11 may be connected (e.g., electrically connected) to the output terminal OUT.

In case that the second switching signal BESR is at a high level, the second switching transistor SWT2 may be turned off such that the output terminal OUT and the first node N1 of the discharge circuit DSC may be electrically separated from each other.

Therefore, the first voltage VGH may be output as the second start signal GB_FLM in the power-on period PON. The power-on period PON may be a specified time period after power of the display device DD (refer to FIG. 1) is switched from an off state to an on state.

In the operation period OP, the first switching signal ESR may be at a high level, and the second switching signal BESR may be at a low level. In case that the first switching signal ESR is at a high level, the first switching transistor SWT1 may be turned off.

In case that the second switching signal BESR is at a low level, the second switching transistor SWT2 may be turned on such that the output terminal OUT and the first node N1 of the discharge circuit DSC may be connected (e.g., electrically connected) to each other.

Therefore, in the operation period OP, a voltage level of the second start signal GB_FLM may be determined according to the first start signal FLM, the first bias clock signal BCLK1, and the second bias clock signal BCLK2.

The operation period OP may include the first frame F1 to the 120th frame F120 illustrated in FIG. 3 or the first frame F1 to 60th frame F60 illustrated in FIG. 4.

In the power-off period POFF, the first switching signal ESR may be at a low level and the second switching signal BESR may be at a high level. In case that the first switching signal ESR is at a low level, the first switching transistor SWT1 may be turned on such that the first voltage line VL11 may be connected (e.g., electrically connected) to the output terminal OUT.

In case that the second switching signal BESR is at a high level, the second switching transistor SWT2 may be turned off such that the output terminal OUT and the first node N1 of the discharge circuit DSC may be electrically separated from each other.

Therefore, the first voltage VGH may be output as the second start signal GB_FLM in the power-off period POFF. The power-off period POFF may be a transitional period in which power of the display device DD (refer to FIG. 1) is switched from an on state to an off state.

In the power-on period PON and the power-off period POFF, in case that a voltage level of the second start signal GB_FLM is in a floating state or at an arbitrary voltage level, the second scan driver SD2 illustrated in FIG. 5 may malfunction. In the power-on period PON and the power-off period POFF, as the voltage level of the second start signal GB_FLM is maintained at the first voltage VGH, the malfunction of the second scan driver SD2 may be prevented.

According an embodiment, a scan driving circuit of a display device may receive a first start signal from a driving controller and may generate a second start signal to generate a first scan signal for a P-type transistor and a second scan signal for an N-type transistor.

According to an embodiment, by maintaining the second start signal at a certain voltage level during a power-on period and a power-off period, malfunction of the scan driving circuit may be prevented.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. An inverter circuit comprising:

an output transistor connected between a first voltage line and an output terminal outputting a second start signal, and including a gate electrode connected to an input terminal receiving a first start signal;

a first switching transistor connected between the first voltage line and the output terminal, and including a gate electrode connected to a first switching line receiving a first switching signal;

a second switching transistor connected between the output terminal and a first node, and including a gate electrode connected to a second switching line receiving a second switching signal; and a discharge circuit that discharges the first node to a first bias clock signal in response to the first start signal, the first bias clock signal, and a second bias clock signal.

2. The inverter circuit of claim 1, wherein the second switching signal is a complementary signal of the first switching signal.

3. The inverter circuit of claim 1, wherein, during a power-on period and a power-off period, the first switching transistor is turned on by the first switching signal, and the second switching transistor is turned off by the second switching signal.

4. The inverter circuit of claim 3, wherein, during the power-on period and the power-off period, the output terminal outputs the second start signal corresponding to a first voltage received through the first voltage line.

5. The inverter circuit of claim 1, wherein, during an operation period, the first switching transistor is turned off by the first switching signal, and the second switching transistor is turned on by the second switching signal.

6. The inverter circuit of claim 5, wherein, during the operation period, the output terminal outputs the second start signal that is a complementary signal of the first start signal.

7. The inverter circuit of claim 1, wherein the discharge circuit includes:

a first transistor connected between a second node and a second clock line, and including a gate electrode connected to the input terminal;

a second transistor connected between the second node and a second voltage line, and including a gate electrode connected to the second clock line;

a third transistor connected between the second node and a third node, and including a gate electrode connected to the second voltage line;

a fourth transistor connected between the first node and a fourth node, and including a gate electrode connected to a first clock line;

a fifth transistor connected between the fourth node and the first clock line, and including a gate electrode connected to the third node; and a capacitor connected between the third node and the fourth node.

8. The inverter circuit of claim 7, wherein the first clock line transfers the first bias clock signal, and the second clock line transfers the second bias clock signal.

9. A scan driving circuit comprising:

an inverter circuit that outputs a second start signal in response to a first start signal, a first switching signal, a second switching signal, a first bias clock signal, and a second bias clock signal;

a first scan driver that outputs first scan signals in response to the first start signal, a first clock signal, and a second clock signal; and a second scan driver that outputs second scan signals in response to the second start signal, the first bias clock signal, and the second bias clock signal, and wherein the inverter circuit includes:

an output transistor connected between a first voltage line and an output terminal outputting the second start signal, and including a gate electrode connected to an input terminal receiving the first start signal;

a first switching transistor connected between the first voltage line and the output terminal, and including a gate electrode connected to a first switching line receiving the first switching signal;

a second switching transistor connected between the output terminal and a first node, and including a gate electrode connected to a second switching line receiving the second switching signal; and a discharge circuit that discharges the first node to the first bias clock signal in response to the first start signal, the first bias clock signal, and the second bias clock signal.

10. The scan driving circuit of claim 9, wherein the second switching signal is a complementary signal of the first switching signal.

11. The scan driving circuit of claim 9, wherein, during a power-on period and a power-off period, the first switching transistor is turned on by the first switching signal, and the second switching transistor is turned off by the second switching signal.

12. The scan driving circuit of claim 11, wherein, during the power-on period and the power-off period, the output terminal outputs the second start signal corresponding to a first voltage received through the first voltage line.

13. The scan driving circuit of claim 9, wherein, during an operation period, the first switching transistor is turned off by the first switching signal, and the second switching transistor is turned on by the second switching signal.

14. The scan driving circuit of claim 13, wherein, during the operation period, the output terminal outputs the second start signal that is a complementary signal of the first start signal.

15. The scan driving circuit of claim 9, wherein the discharge circuit includes:

a first transistor connected between a second node and a second clock line, and including a gate electrode connected to the input terminal;

a second transistor connected between the second node and a second voltage line, and including a gate electrode connected to the second clock line;

a third transistor connected between the second node and a third node, and including a gate electrode connected to the second voltage line;

a fourth transistor connected between the first node and a fourth node, and including a gate electrode connected to a first clock line;

a fifth transistor connected between the fourth node and the first clock line, and including a gate electrode connected to the third node; and a capacitor connected between the third node and the fourth node, the first clock line transfers the first bias clock signal, and the second clock line transfers the second bias clock signal.

16. A display device comprising:

a display panel including a pixel;

a scan driving circuit that provides a first scan signal and a second scan signal to the pixel;

a data driving circuit that provides a data signal to the pixel; and a driving controller that provides a first start signal, a first switching signal, a second switching signal, a first bias clock signal, and a second bias clock signal to the scan driving circuit, wherein the scan driving circuit includes:

an inverter circuit that outputs a second start signal in response to the first start signal, the first switching signal, the second switching signal, the first bias clock signal, and the second bias clock signal;

a first scan driver that outputs the first scan signal in response to the first start signal, a first clock signal, and a second clock signal; and a second scan driver that outputs the second scan signal in response to the second start signal, the first bias clock signal, and the second bias clock signal, the inverter circuit outputs the second start signal of a certain voltage level in response to the first switching signal of a first level and the second switching signal of a second level during a power-on period and a power-off period, and the inverter circuit outputs the second start signal that is a complementary signal of the first start signal during an operation period.

17. The display device of claim 16, wherein the inverter circuit includes:

an output transistor connected between a first voltage line and an output terminal outputting the second start signal, and including a gate electrode connected to an input terminal receiving the first start signal;

a first switching transistor connected between the first voltage line and the output terminal, and including a gate electrode connected to a first switching line receiving the first switching signal;

a second switching transistor connected between the output terminal and a first node, and including a gate electrode connected to a second switching line receiving the second switching signal; and a discharge circuit that discharges the first node to the first bias clock signal in response to the first start signal, the first bias clock signal, and the second bias clock signal.

18. The display device of claim 17, wherein during the power-on period and the power-off period, the first switching transistor is turned on by the first switching signal, and the second switching transistor is turned off by the second switching signal, and during the operation period, the first switching transistor is turned off by the first switching signal, and the second switching transistor is turned on by the second switching signal.

19. The display device of claim 17, wherein the discharge circuit includes:

a first transistor connected between a second node and a second clock line, and including a gate electrode connected to the input terminal;

a second transistor connected between the second node and a second voltage line, and including a gate electrode connected to the second clock line;

a third transistor connected between the second node and a third node, and including a gate electrode connected to the second voltage line;

a fourth transistor connected between the first node and a fourth node, and including a gate electrode connected to a first clock line;

a fifth transistor connected between the fourth node and the first clock line, and including a gate electrode connected to the third node; and a capacitor connected between the third node and the fourth node, the first clock line transfers the first bias clock signal, and the second clock line transfers the second bias clock signal.

20. The display device of claim 16, wherein the pixel includes:

a first transistor receiving the first scan signal; and a second transistor receiving the second scan signal, the first transistor is a P-type transistor, and the second transistor is an N-type transistor.

* * * * *